United States Patent Office 3,376,349
Patented Apr. 2, 1968

3,376,349
PRODUCTION OF DICHLOROCARBENE ADDUCTS
Herman A. Bruson, Woodbridge, and Howard L. Plant, Milford, Conn., assignors to Olin Mathieson Chemical Corporation, a corporation of Virginia
No Drawing. Filed Aug. 25, 1966, Ser. No. 574,950
14 Claims. (Cl. 260—611)

This invention relates to dichlorocarbene adducts of olefines and a method for their preparation.

It is already known from the published work of Doering and Hoffmann (Jour. Amer. Chem. Soc., 76, 61662-65 (1954)) that dichlorocarbene $>CCl_2$ can be generated and added in situ to olefines, by reacting chloroform with anhydrous potassium tertiary butoxide; and also that the use of aqueous potassium hydroxide leads to extremely poor (less than 1 percent) yields of dichlorocarbene-olefine addition products.

It is also known that good yields of dichlorocarbene adducts of olefinic hydrocarbons can be obtained by reacting chloroform in the presence of unsaturated hydrocarbons, with alkali metal hydroxides which "*initially are practically anhydrous*" if the reaction is conducted in certain solvents notably glycol dimethyl ethers such as diglyme or triglyme or in cyclic sulfones such as teramethylene sulfone. (G. C. Robinson, French Pat. 1,363,460 (1964); Tetrahedron Letters, 22, 1749-52 (1965)). Olefines which contain labile chlorine atoms give much poorer yields due to dehydrohalogenation or hydrolysis.

Other methods for preparing dichlorocarbene in situ such as heating sodium trichloroacetate, or reacting chloroform with olefines and ethylene oxide, also utilize essentially anhydrous conditions to generate the dichlorocarbene.

One object of the present invention is to provide an inexpensive method for preparing dichlorocarbene adducts of olefins without the use of costly solvents such as diglyme, triglyme or cyclic sulfones.

Another object of the present invention is to provide a method for preparing dichlorocarbene adducts of olefines without the necessity that great care be taken to insure that the regeants used and the reaction vessels employed be essentially anhydrous to begin with.

Still another object of the present invention is to provide a method for obtaining dichlorocarbene adducts of unsaturated chloro compounds such as 2-chloroethyl vinyl ether which tends to split out hydrogen chloride on treatment with dry alkali metal hydroxides, (Butler and Nash, Jour. Amer. Chem. Soc. 73, 2539 (1951)); or of methally chloride that forms ethers on treatment with alkali metal alkoxides; but which according to the present invention give good yields of dichlorocyclopropanes as indicated below:

(a)
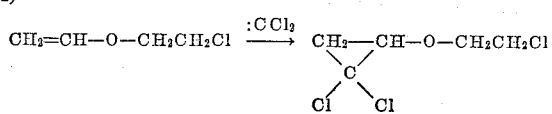

(b)
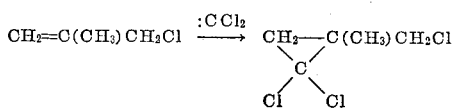

According to the present invention, dichlorocarbene adducts of olefinic compounds are obtained under conditions which are *not* initially practically anhydrous, by reacting chloroform and a suitable olefinic dichloro-carbene acceptor with aqueous alkali metal hydroxide containing initially from 0.10 to 1.0 mole of water per mole of alkali metal hydroxide in the presence of a saturated tertiary aliphatic monohydric alcohol having 4 to 5 carbon atoms.

This could not have been predicted from the prior art which ruled out the formation of good yields of dichlorocarbene in the presence of more than traces of water.

An advantage of the present process, in addition to its lower cost solvent, is the fact that the alkali metal hydroxide is partly or completely in solution, which is conducive to good stirring, and better heat conduction in commercial operation. Furthermore, it is not necessary that great care be taken that all reagents and vessels used are essentially anhydrous to start. It is of interest at this point also to mention that the use of other alcohols in place of tertiary butyl alcohol or tertiary amyl alcohol, such as methanol, ethanol, isopropanol, n-, sec-, or isobutanol, iso-amyl alcohol, cyclo-hexanol, diisobutylcarbinol, methoxyethanol, α-terpineol, or ethylene glycol under analogous conditions, gave mediocre yields of dichlorocarbene adducts.

In practicing this invention, one can use the hydroxides of sodium, potassium or lithium; of which sodium hydroxide because of its lower cost, is preferred. The quantity of alkali metal hydroxide can be varied over a range, preferably from about one mole to five moles for each mole of chloroform. The ratio of chloroform to olefinic compound can be varied from less than one mole of chloroform to an excess from 2 to 3 moles of chloroform per mole of olefinic acceptor. The quantity of tertiary alcohol used can be varied over a range from about 0.25 mole to 3.0 moles per mole of alkali metal hydroxide. These ratios are not to be construed as limiting, but only to indicate a practical range of operation. It has also been found advantageous to carry out the reaction in several stages so as to completely utilize all of the olefine reactant in those cases where the chloroform is consumed at a faster rate than adduct formation.

Olefinic acceptors suitable for use in the process of this invention include, for example, beta-chloroethyl vinyl ether, methally chloride, styrene, alpha-methyl styrene, cyclohexene, 4-vinyl cyclohexene, dicyclopentadiene, 5-cyclooctadiene, and vinyl allyl ether.

Other typical olefinic acceptors which can be used in place of those shown above in the method of this invention are, for example, propylene, isobutylene, butylene-1 and -2, allene, trimethylethylene, the normal and branched chain olefines having from 6 to 18 carbon atoms, vinyl chloride, vinylidene chloride, vinyl ethyl ether, vinyl butyl ether, and other vinyl ethers, cycloheptatriene, cyclododecatriene, butadiene, isoprene, allybenzene, dipentene, alpha or beta-pinene, camphene, norbornylene, vinyl naphthalene, vinyl acetylene, alpha-terpineol, etc.

In order to illustrate this invention the following examples are given.

EXAMPLE I

A mixture 106.5 (1.0 mole) beta-chloroethylvinyl ether, 120 g. (1.0 mol.) of chloroform, 120 g. (3.0 mol.) of sodium hydroxide, 20 g. (1.11 mol.) of water and 100 ml. of tertiary butyl alcohol was vigorously stirred under a good reflux condenser and heated on a water bath to 80–85° C. for a period of 2½ hours, during which time an exothermic reaction occurred. After cooling, the mixture was diluted with 500 ml. of cold water and the layers separated. The water insoluble layer was acidified with 5–10 ml. of concentrated hydrochloric acid, washed with water, dried over sodium sulfate and distilled under reduced pressure. The product distilling at 60–64° C./2 mm. (124 g., 65 percent yield) was identified by analysis as having the formula:

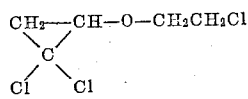

The pure compound was a colorless liquid boiling at 57–58° C./2 mm.; $n_D^{25}$ 1.4784; $d_{25}^{25}$ 1.327.

EXAMPLE II

A mixture of 132 g. (1.0 mole) dicyclopentadiene, 120 g. (1.0 mole) chloroform, 80 g. (2.0 moles) sodium hydroxide, 10 g. (0.56 m.) water, and 100 ml. tertiary butyl alcohol was vigorously stirred and heated under reflux for 2 hours until the exothermic reaction had ceased. After cooling, an additional quantity of 40 g. sodium hydroxide (1 mol.) and 60 g. (0.5 mole) of chloroform was added and the mixture stirred and heated under reflux for 1.25 hours longer. After cooling, washing, and work up as above, the dichlorocarbene adduct of dicyclopentadiene was obtained as a colorless liquid, B.P. 118–120° C./4.5 mm.; $n_D^{25}$ 1.5388. Yield 108 g. (50.2 percent of theory). Its formula is:

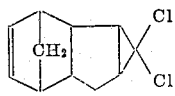

EXAMPLE III

A mixture of 118 g. (1.0 mole) of alpha-methyl styrene, 120 g. (1.0 mole) chloroform, 80 g. (2 moles) sodium hydroxide, 10 ml. (0.56 mole) of water, and 100 g. tertiary butyl alcohol was rapidly stirred and heated under reflux at 75–85° C. on a water bath for 40 minutes, during which time an exothermic reaction occurred. The mixture was then cooled to about 30° C. Sodium hydroxide (40 g., 1.0 mole), and 60 g. (0.5 mole) of additional chloroform was then added, and the mixture was heated again at 75–85° C. for forty minutes under reflux while stirring vigorously. After pouring the product into 500 ml. of ice water, separating the water-insoluble layer and working it up as described above, the dichlorocarbene adduct having the formula:

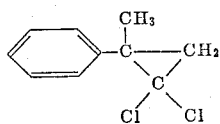

was obtained as a colorless liquid, boiling at 79–84° C./2 mm., $n_D^{25}$ 1.5398. Yield 175 g. or 87 percent of theoretical based on the alpha-methyl styrene.

EXAMPLE IV (a) A mixture of 104 g. (1 mole) styrene, 120 g. (1.0 mole) of chloroform, 120 g. (3.0 moles) sodium hydroxide, 10 g. of water and 100 ml. of tertiary amyl alcohol was rapidly stirred and heated under reflux at 90–97° C. for 35 minutes. At this point the mixture contained about 1.5 moles of water, and the conversion to the dichlorocarbene adduct was about 60 percent of theory based on the styrene charged.

An additional quantity of 60 g. (0.5 mole) of chloroform and 40 g. (1 mole) of sodium hydroxide was added to the cooled product. This reaction mixture was rapidly stirred and then reheated to 101° C. under reflux during a period of 45 minutes. Upon cooling, pouring into 500 ml. of water, and working up the water-insoluble layer by distillation under reduced pressure, the yield of styrene-dichlorocarbene adduct obtained, (boiling at 77–79° C./2 mm.; $n_D^{25}$ 1.5505) was 153.5 g. or 82 percent of theory, based on the styrene charged. It was identical with the product previously described by Bruson and O'Day (U.S. Patent 3,012,079) made by using anhydrous sodium tertiary butoxide, having the formula:

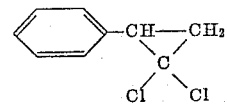

(b) To a rapidly stirred mixture of 104 g. styrene, 160 g. sodium hydroxide, 10 ml. of water and 100 ml. of tertiary amyl alcohol which was heated to 85° C. under a reflux condenser by means of a hot water bath, there was added dropwise 150 g. of chloroform during the course of one hour. The reaction temperature was maintained at 95–105° C. by the rate of the addition, and the mixture was heated and stirred for one hour at 90–95° C. after addition was completed. Work up of the product as in (a) above gave 147 g. (79 percent of theory) of the styrene-dichlorocarbene adduct.

EXAMPLE V

A mixture of 108 g. (1.0 mole) of 4-vinyl cyclohexene, 120 g. (1.0 mole) chloroform, 80 g. (2 moles) sodium hydroxide, 10 g. water and 100 ml. of tertiary butyl alcohol was rapidly stirred and heated under reflux to 85° C. for one hour. An additional quantity of 60 g. (0.5 mole) chloroform and 40 g. (1.0 mole) of sodium hydroxide was then added to the cooled solution which now contained about 1.57 moles of water, and a 42 percent yield of the dichlorocarbene adduct

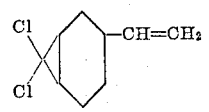

This mixture was rapidly stirred and reheated to 87° C. for an additional forty-five minutes; cooled, diluted with water, and the water-insoluble layer worked up as described above, to give 103 g. (54 percent yield) of the dichlorocarbene mono-adduct shown above. It is a colorless liquid boiling at 102–104° C./15 mm., $n_D^{25}$ 1.5068.

EXAMPLE VI

A mixture of 110 g. (1.0 mole) of 1,5-cyclooctadiene, 180 g. (1.5 mole) chloroform, 120 g. (3.0 moles) sodium hydroxide, 10 g. (0.56 mole) water and 100 ml. of tertiary butyl alcohol was vigorously stirred and heated under reflux at 80–85° C. for 1½ hours on a water bath. The mixture was then cooled, diluted with 400 ml. of water, shaken with 100 ml. of methylene dichloride, the water insoluble layer separated, neutralized with hydrochloric acid, washed with water, dried and distilled under reduced pressure. The mono-adduct of dichlorocarbene an 1,5-cyclooctadiene having the formula:

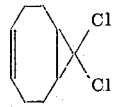

distilled over at 73–76° C./2.0 mm. as a colorless liquid, $n_D^{25}$ 1.5230. Yield 82 g. (43 percent of theory).

The residue in the distillation flask crystallized. Yield 36 g. (13.5 percent). M.P. 174–175° C., (recrystallized from ethanol). It was identified by analysis of the bis-adduct having the formula:

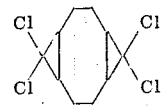

previously described by G. J. Fray (Jour. Chem. Soc. (London) 1963, 4284–5) who obtained it in very low yield together with the mono-adduct by heating 1,5-cyclooctadiene with sodium trichloracetate for 16 hours at 100–110° C.

EXAMPLE VII

A mixture of 84 g. (1.0 mole) vinyl allyl ether, 120 g. (1.0 mole) of chloroform, 80 g. (2.0 moles) sodium hydroxide, 10 g. water and 100 ml. tertiary butyl alcohol was stirred vigorously and heated under reflux at 75–80° C. for two hours on a water bath. After dilution with 450 ml. of cold water and work up of the water-insoluble layer as described above distillation under reduced pressure gave 80 g. of pure allyloxy dichlorocyclopropane (46.5 percent yield)

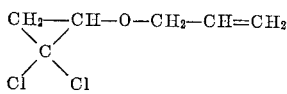

as a colorless liquid, boiling at 85–86° C./55 mm.; $n_D^{25}$ 1.4610.

EXAMPLE VIII

A mixture of 90.5 g. (1.0 mole) methallyl chloride, 120 g. (1.0 mole) chloroform, 120 g. (3.0 moles) sodium hydroxide, 10 ml. of water and 100 ml. of tertiary butyl alcohol was rapidly stirred and boiled under reflux by means of a hot water bath, for a period of 55 minutes, during which time the temperature of the reaction mixture reached 73° C. The mixture was then allowed to cool to room temperature and an additional quantity of 60 g. chloroform and 40 g. sodium hydroxide added. The mixture was stirred and reheated to 80° C. during the course of 65 minutes. Upon pouring into water, separating the water-insoluble layer and distilling the latter under reduced pressure, the dichlorocarbene adduct having the formula:

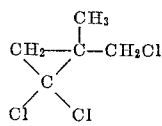

was obtained as a colorless liquid (71.5 g.) boiling at 89° C./50 mm.; $n_D^{25}$ 1.4858. Yield 41 percent of theory.

EXAMPLE IX

A rapidly stirred mixture of 82 g. (1.0 mole) cyclohexene, 120 g. (1.0 mole) chloroform, 120 g. (3.0 moles) sodium hydroxide, 10 ml. water and 100 ml. tert-butyl alcohol was boiled under reflux to a temperature of 80° C. during a period of 40 minutes. Additional chloroform (60 g.) and sodium hydroxide (40 g.) was then added and heating was continued for 40 minutes to a temperature of 88° C. Work-up by washing and distillation gave 116.5 g. (71 percent of theory) of the dichlorocarbene adduct

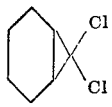

described by Doering and Hoffman (J. Amer. Chem. Soc. 76, 6162–65 (1954)).

The reactions can be carried out in a closed vessel under pressure when the olefins used is a gas or low boiling compound.

The products are useful as insecticides, fungicides and nematocides as described in U.S. Patent 3,012,079.

What is claimed is:

1. A method for preparing dichlorocarbene adducts of olefines which comprises heating chloroform and an olefinic dichlorocarbene acceptor with aqueous alkali metal hydroxide containing initially from 0.1 to 1.0 mole of water per mole of alkali metal hydroxide, in the presence of a saturated tertiary aliphatic monohydric alcohol having 4 to 5 carbon atoms.

2. The method of claim 1 wherein the alkali metal hydroxide is sodium hydroxide.

3. The method of claim 1 wherein the tertiary monohydric alcohol is tertiary butyl alcohol.

4. The method of claim 1 wherein the tertiary monohydric alcohol is tertiary amyl alcohol.

5. The method of claim 1 wherein the olefinic acceptor is a member of the group consisting of beta-chloroethylvinyl ether, methallyl chloride, styrene, alpha-methyl styrene, cyclohexene, 4-vinyl cyclohexene, dicyclopentadiene, 1,5-cyclooctadiene, and vinyl allyl ether.

6. The method of claim 1 wherein the said alkali metal hydroxide is sodium hydroxide, the said tertiary monohydric alcohol is tertiary butyl alcohol and the said olefinic acceptor is beta-chloroethylvinyl ether.

7. The method of claim 1 wherein the said alkali metal hydroxide is sodium hydroxide, the said tertiary monohydric alcohol is tertiary butyl alcohol and the said olefinic acceptor is dicyclopentadiene.

8. The method of claim 1 wherein the said alkali metal hydroxide is sodium hydroxide, the said tertiary monohydric alcohol is tertiary butyl alcohol and the said olefinic acceptor is alpha-methyl styrene.

9. The method of claim 1 wherein the said alkali metal hydroxide is sodium hydroxide, the said tertiary monohydric alcohol is tertiary amyl alcohol and the said olefinic acceptor is styrene.

10. The method of claim 1 wherein the said alkali metal hydroxide is sodium hydroxide, the said tertiary monohydric alcohol is tertiary butyl alcohol and the said olefinic acceptor is 4-vinylcyclohexene.

11. The method of claim 1 wherein the said alkali metal hydroxide is sodium hydroxide, the said tertiary monohydric alcohol is tertiary butyl alcohol and the said olefinic acceptor is 1,5-cyclooctadiene.

12. The method of claim 1 wherein the said alkali metal hydroxide is sodium hydroxide, the said tertiary monohydric alcohol is tertiary butyl alcohol, and the said olefinic acceptor is vinyl allyl ether.

13. The method of claim 1 wherein the said alkali metal hydroxide is sodium hydroxide, the said tertiary monohydric alcohol is tertiary butyl alcohol, and the said olefinic acceptor is methallyl chloride.

14. The method of claim 1 wherein the said alkali metal hydroxide is sodium hydroxide, the said tertiary monohydric alcohol is tertiary butyl alcohol and the said olefinic acceptor is cyclohexene.

References Cited

UNITED STATES PATENTS

| | | | |
|---|---|---|---|
| 3,046,314 | 7/1962 | Fields et al. | 260—649 X |
| 3,047,633 | 7/1962 | Bruson et al. | 260—611 |
| 3,265,714 | 8/1966 | Robinson | 260—611 X |
| 3,265,744 | 8/1966 | Robinson | 260—611 X |

OTHER REFERENCES

Doering et al.: Jour. Amer. Chem. Soc., vol. 76 (1954), pp. 6162–6165.

Doering et al.: Jour. Amer. Chem. Soc., vol. 80 (1958), pp. 5274–5277.

BERNARD HELFIN, *Primary Examiner.*